US007565911B2

(12) United States Patent
Bonta, Jr.

(10) Patent No.: US 7,565,911 B2

(45) Date of Patent: Jul. 28, 2009

(54) TWO STAGE REGULATOR METHOD AND APPARATUS

(75) Inventor: Carl J. Bonta, Jr., Elgin, IL (US)

(73) Assignee: Absolute Air, Inc., Wheeling, IL (US)

(*) Notice: Subject to any disclaimer, the term of this patent is extended or adjusted under 35 U.S.C. 154(b) by 663 days.

(21) Appl. No.: 11/160,733

(22) Filed: Jul. 6, 2005

(65) Prior Publication Data

US 2006/0005887 A1 Jan. 12, 2006

Related U.S. Application Data

(60) Provisional application No. 60/585,618, filed on Jul. 6, 2004.

(51) Int. Cl.
*F17D 1/00* (2006.01)

(52) U.S. Cl. .................... 137/14; 137/613; 137/505.12; 137/505.25; 124/73; 124/75

(58) Field of Classification Search ................ 137/613, 137/505.25, 505.12, 14; 124/73, 74, 71, 124/75–77
See application file for complete search history.

(56) References Cited

U.S. PATENT DOCUMENTS 3,719,160 A * 3/1973 Christianson ............... 137/557
3,995,656 A * 12/1976 Mills, Jr. ..................... 137/497
4,413,649 A 11/1983 Rodd et al.
4,467,828 A * 8/1984 Gneiding ............... 137/505.25
4,655,246 A 4/1987 Phlipot et al.
5,562,240 A * 10/1996 Campbell ................... 227/130
5,613,483 A * 3/1997 Lukas et al. .................. 124/73
5,669,369 A 9/1997 Scott
5,860,447 A 1/1999 Chu
6,360,736 B1 * 3/2002 Juan ........................... 124/77
6,405,722 B2 6/2002 Colby
6,435,032 B1 * 8/2002 Holloway et al. ............. 73/713
6,543,475 B2 4/2003 Colby
6,637,450 B2 * 10/2003 Huang ....................... 137/68.3
6,932,128 B2 8/2005 Turan, Jr.
7,287,527 B1 * 10/2007 Piper ........................... 124/72

* cited by examiner

*Primary Examiner*—Kevin L Lee
(74) *Attorney, Agent, or Firm*—Edward Bishop

(57) ABSTRACT

A two stage air regulator is disclosed wherein both stages are contained in a single billet, extruded, or machined housing. The first stage receives an input pressure of about 5000 PSI from an air tank or other source. The first stage reduces the pressure which is received by the second stage having a user adjustable output of between 0 PSI to about 150 PSI. Further, the output of the second stage is received by a pneumatically operated tool such as a nailer or other tool that operates in the output pressure range.

10 Claims, 4 Drawing Sheets

110 152 186 154 124 126 130 144 150 146 182 170 126 164 148 184 128 160 142 132 134 140 126 180 172 136 138 168 122

110
122
124
126
126
126
128
130
132
134
136
138
140
142
144
146
148
150
152
154
160
164
168
170
172
180
182
184
186

TWO STAGE REGULATOR METHOD AND APPARATUS

RELATED APPLICATIONS

This application claims the benefit of U.S. Provisional Patent Application Ser. No. 60/585,618, filed Jul. 6, 2004.

FIELD OF THE INVENTION

The present invention relates to regulator devices and methods for regulating an outlet gas pressure wherein the gas is provided by a pressurized source such as a vessel or the like.

FEDERALLY SPONSORED RESEARCH OR DEVELOPMENT

None.

BACKGROUND OF THE INVENTION

As the use of paintball guns, portable pneumatically operated tools and other portable gas operated accessories has increased, so has the need for lightweight regulators capable of reducing a high pressure gas supply to an acceptable pressure level such as between about 0 PSI (pounds per square inch) to 150 PSI. Moreover, it is desired that the regulator housing be robust.

The unique invention disclosed herein provides a solution for providing a lightweight regulator having a robust housing and capable of reducing a high pressure gas input to within a range of about 0 PSI to 150 PSI.

SUMMARY OF INVENTION

The present invention is directed to a two stage regulator having a single billet, extruded, or machined housing. The first stage is suitable for receiving an input gas pressure of about 5000 PSI from an air tank or other pressurized source. The first stage reduces the input gas pressure and supplies the second stage. Preferably, but not necessarily, the second stage is adjustable, such that a user can adjust the gas pressure output to within a range of, for example, 0 PSI to about 150 PSI.

According to another aspect of the invention, a method is provided. The method includes receiving an input gas pressure of about 5000 PSI within a first stage, reducing the pressure to an intermediate pressure, supplying a second stage with the intermediate pressure, and providing for adjustably selecting the output pressure of the second stage, within the output pressure is within a range of about 0 PSI to 150 PSI. Further, the output pressure is received by a pneumatically operated tool or the like.

Other embodiments, systems, methods, features, and advantages of the present invention will be, or will become, apparent to one having ordinary skill in the art upon examination of the following drawings and detailed description. It is intended that all such additional systems, methods, features, and advantages included within this description be within the scope of the present invention, and be protected by the accompanying claims.

DESCRIPTION OF THE DRAWINGS

The invention may be better understood with reference to the following drawings. The components in the drawings are not necessarily to scale, emphasis instead being placed upon illustrating the principles of the invention. In the drawings, like reference numerals designate corresponding parts throughout the several views.

DESCRIPTION OF DETAILED EMBODIMENTS

The following descriptions of detailed embodiments are for exemplifying the principles and advantages of the inventions claimed herein. They are not to be taken in any way as limitations on the scope of the inventions.

Figure 1:
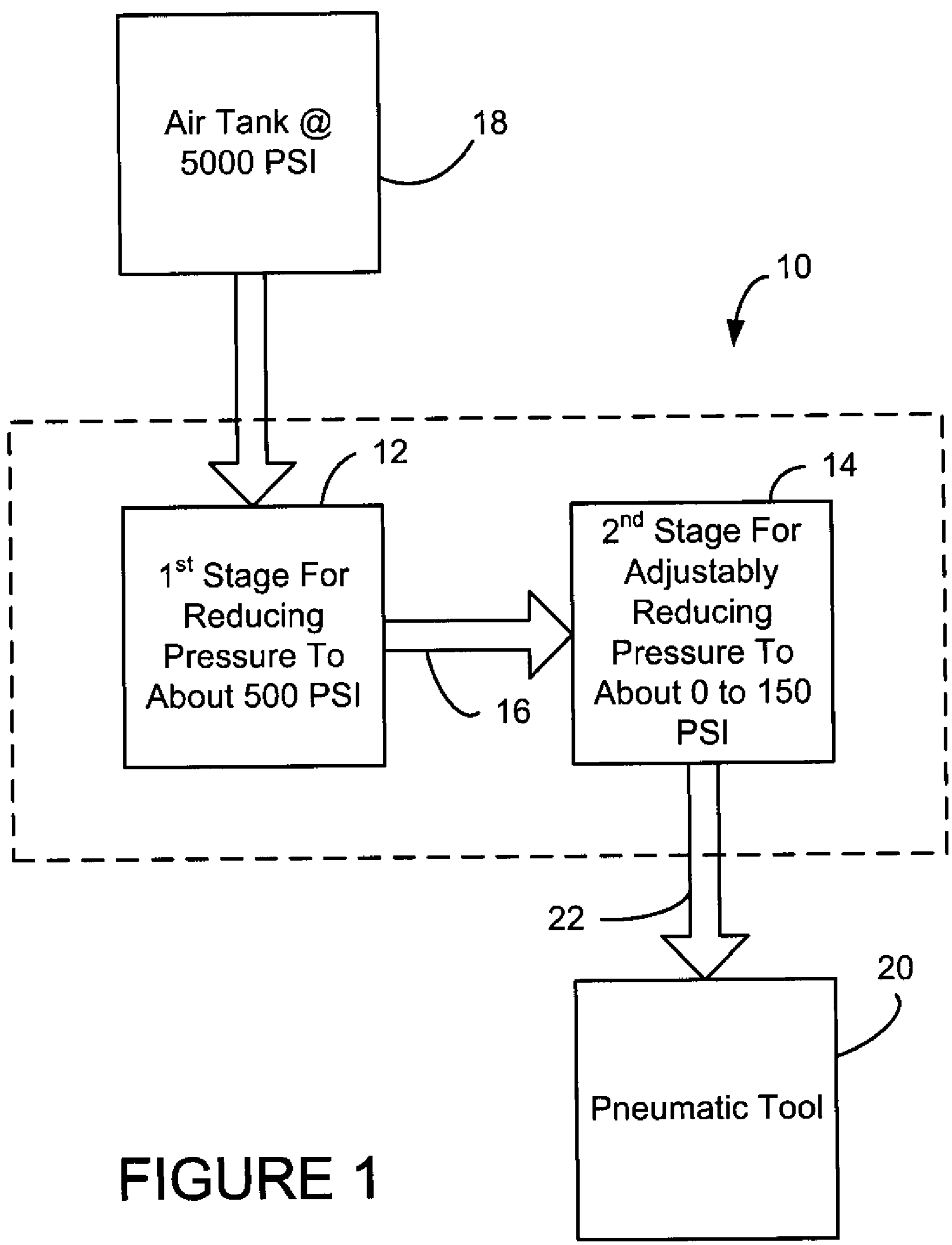
FIG. 1 is a simplified block diagram of a two stage regulator in accordance with the present invention.

Turning to the FIGURES, and in particular to FIG. 1, a simplified block diagram is provided of a two stage regulator in accordance with the present invention. Accordingly, the regulator 10 includes a first stage 12 and a second stage 14 with a passage 16 therebetween.

The first stage 12 is operatively coupled to an air tank 18, or other gas pressure source, to provide a gas at an input pressure. For instance, but not necessarily, the input pressure can be 5000 PSI.

The first stage reduces the input pressure to provide the gas at an intermediate pressure within the passage 16. In turn, the gas at the intermediate pressure is received by the second stage 14.

The second stage 14 is operatively coupled to a pneumatic tool 20 (e.g., air impact wrench, spray, etc.) or other device that operates within at a specified gas pressure or gas pressure range. Preferably, but not necessarily, the second stage 14 is user adjustable for allowing the user to specify the pressure of the gas at the output 22 of the regulator 10.

Figure 2:
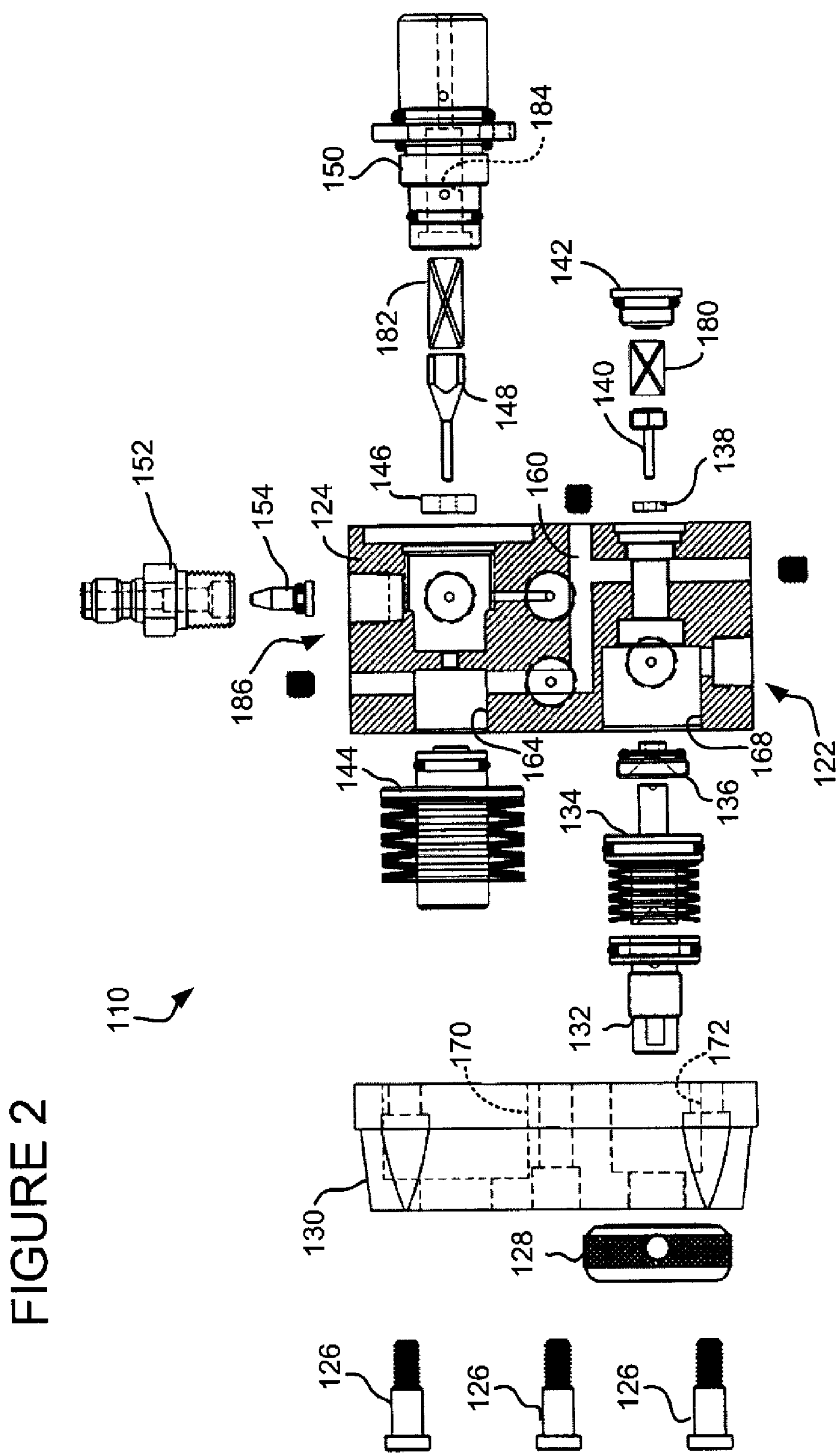
FIG. 2 is an exploded view, with some portions in phantom or cross-section of a two stage regulator in accordance with the present invention.

Turning to FIG. 2, an exploded view is provided of a two stage regulator 110 in accordance with the present invention. The regulator 110 includes a main body 124, a plurality of shoulder screws 126, a low pressure adjustment knob 128, a cap 130, a low pressure adjuster 132, a low pressure piston 134, a low pressure seat insert 136, a low pressure regulator seat 138, a low pressure valve pin 140, a low pressure spring plug 142, a high pressure piston 144, a high pressure regulator seat 146, a high pressure valve pin 148, a high pressure cartridge 150, a fill quick disconnect adapter 152, and a fill strut 154.

Figure 3:
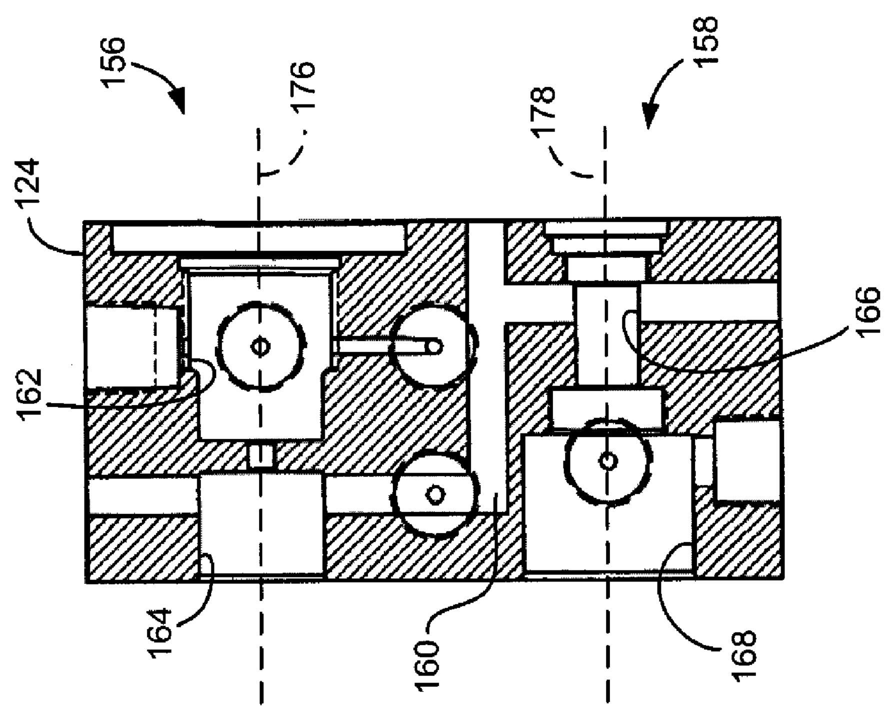
FIG. 3 is a cross-sectional view of the housing to the regulator depicted in FIG. 2.
Figure 5:
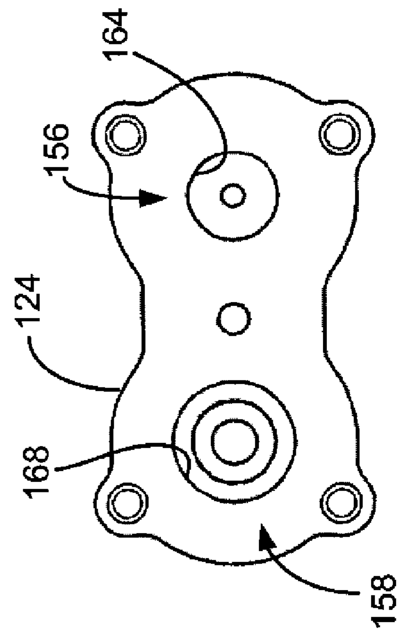
FIGS. 4 and 5 are elevation views of opposite sides of the housing of FIG. 3.
Figure 4:
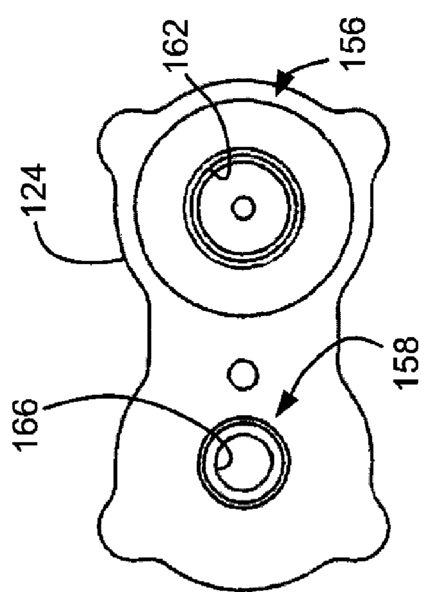

Turning to FIGS. 3-5, the main body 124 of the regulator includes a first cylindrical bore 156, a second cylindrical bore 158, and a passage therebetween 160. The main body 124 further includes a high pressure chamber 162, a high pressure piston chamber portion 164, an intermediate pressure inlet chamber 166, and a low pressure piston chamber portion 168.

Figure 7:
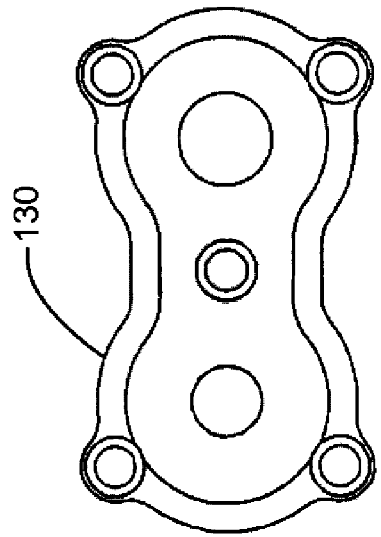
FIGS. 6 and 7 are elevation views of opposite sides of the cap to the housing depicted in FIG. 2.
Figure 6:
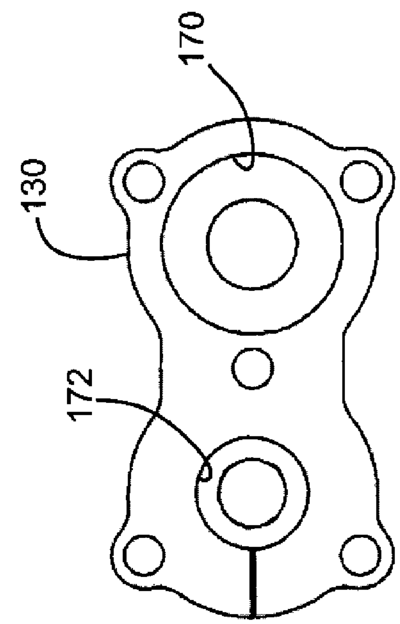

Turning to FIGS. 6 and 7, the cap 130 includes a high pressure chamber portion 170, a low pressure chamber portion 172, and a groove or channel 174 extending therefrom.

Referring back to FIGS. 2-5, the main body 124 is preferably a billet or extruded metal or metal alloy. Extending through the main body 124 are the cylindrical bores 156,158. The first cylindrical bore 156 having a longitudinal axis 176. Likewise, the second cylindrical bore 158 has a longitudinal axis 178. As shown in FIG. 3, the first longitudinal axis 176 and the second longitudinal axis 178 are spaced apart from each other. Moreover, the first longitudinal axis 176 and the second longitudinal axis 178 are parallel to each other.

The first cylindrical bore 156 defines, at least in part, the high pressure inlet chamber 162 and the piston chamber portion 164 which are in fluid communication with each other as a result of being within the same bore 156. Likewise, the second cylindrical bore 158 defines, at least in part, the intermediate pressure inlet chamber 166 and the piston chamber portion 168 which are in fluid communication with each other as a result of being within the same bore 158.

The passageway 160 extends between the first cylindrical bore 156 and the second cylindrical bore 158. The passageway 160 provides for the high pressure piston chamber portion 164 to be in fluid communication with the intermediate pressure inlet chamber 166.

As shown in FIG. 2, openings in the passageway 160 on the outside of the main body 124 are sealed with set screws or the like. Further, the passageway 160 and the bores 158 and 160 can be furnished with burst disks or the like to allow the escape of excessive pressure therein.

Turning to FIGS. 2-7, the cap 130 is attached to the main body 124 by a plurality of fasteners, screws, bolts 126 or other conventional means. With the cap 130 attached to the main body 124, the high pressure chamber portion 170 of the cap is in coaxial alignment with the high pressure chamber portion 164 of the main body, to form a high pressure chamber 170, 164 having a wide diameter portion 170 and a small diameter portion 164. Further, the low pressure chamber portion 172 of the cap 130 is in coaxial alignment with the low pressure chamber portion 168 of the main body, to form a low pressure chamber 172,168.

As shown in FIG. 2, the low pressure piston 134 is contained within the low pressure chamber 172,168. The low pressure piston includes a disk member with a shaft in coaxial alignment and extending therefrom. A conventional o-ring is mounted in a conventional manner about the outer perimeter of disk.

Further, a plurality of Belleville springs (i.e., conical shaped disk springs) are coaxially mounted about the shaft of the piston 134. In an embodiment, but not necessarily, the springs can be stacked in series on the piston shaft. However, the springs can be stacked in numerous other combinations such as, but not limited to, some springs being stacked in parallel and/or in series, or all springs being stacked in parallel. Accordingly, unless specified in the claims, the springs can be stacked in any suitable configuration as recognized by those having ordinary skill in the art.

The low pressure adjustor 132 and the low pressure seat insert 136 are located at opposite ends of the piston 134. The low pressure adjustor 132 includes a disk member and a shaft in coaxial alignment and extending therefrom. A conventional o-ring is mounted in a convention manner about the outer perimeter of the disk. The distal end of the shaft extends through the cap 130 and is attached to adjustment knob 128 in a conventional manner, such as by a set screw or the like. Preferably, a portion of the shaft of the low pressure adjustor 132 is threaded to engage like threads in the cap 130. Thus, turning the knob 128 results in longitudinal movement of the adjustor 132, and thus the low pressure piston 134.

The low pressure seat insert 136 has a center aperture passing therethrough. In an embodiment, the aperture is general funnel shaped. Further, an o-ring is mounted about the seat insert 136 and engages the main body 24.

The low pressure valve pin 140 passes through the aperture within the seat insert 136. Further, the pin 140 is received by an aperture within the low pressure regulator seat 138.

The distal end of the pin 140 abuts against an end of the shaft to the low pressure piston 134. Further, the proximal end of the pin 140 abuts against a compression spring 180 positioned between the pin 140 and the low pressure spring plug 142 that seals an open end to the second cylindrical bore 158.

The low pressure spring plug 142 can be attached to the main body 124 by threads located on the plug 142 that mate with like threads within the second bore 158. Further, an o-ring can be attached to the plug 142.

The high pressure piston 144 is contained within the high pressure chamber 170,164. The high pressure piston includes a disk with a shaft extending therefrom and in coaxial alignment. A conventional o-ring is mounted in a conventional manner about a portion of the shaft.

Coaxially mounted about the shaft of the piston 144 are a plurality of Belleville springs (i.e., conical shaped disk springs). In an embodiment, but not necessarily, the springs can be stacked in series. However, as indicated previously, the springs can be stacked in numerous other combinations such as, but not limited to, some springs being stacked in parallel and/or in series, or all springs being stacked in parallel. Accordingly, unless specified in the claims, the springs can be stacked in any suitable configuration as recognized by those having ordinary skill in the art.

The high pressure valve pin 148 is received by an aperture within the high pressure regulator seat 146. The distal end of the pin 148 abuts against an end of the piston 144. Further, the proximal end of the pin 148 abuts against a compression spring 182 wherein the pin's proximal end and the compression spring are received within a varying diameter bore 184 within the high pressure cartridge 150.

The high pressure cartridge 150 can be secured to the housing 124 by using mating threads on both the housing and the cartridge. Further, the cartridge 150 can have a plurality of conventional o-rings mounted thereto to provide a seal between the housing and the cartridge.

The end of the cartridge 150 extending from the housing 124 can be secured to a tank or other pressure storage vessel (not shown) that can be filled, if desired, via the fill quick disconnect 152 and thus through the regulator 110. Accordingly, the tank can provide a source of high pressure (e.g., initial at about 5,000 PSI) to the regulator 110 if a fill source is not operating or connected to the fill quick disconnect 152.

The fill quick disconnect 152 is coupled to the inlet 186 of the housing 125. The disconnect 152 is conventional in design and can be connected by using mating threads on both the disconnect and the housing 124. The disconnect provides for removably attaching a hose to the regulator wherein, in an embodiment, the hose extends from a high pressure source such as an air tank or compressor.

To prevent gas from escaping the fill quick disconnect 152 whenever the hose is removed therefrom, the fill strut 154 is fitted within the disconnect. Further, to provide a seal, a conventional o-ring can be attached to the fill strut 154.

It should be emphasized that the above-described embodiments of the present invention, particularly, any "preferred" embodiments, are possible examples of implementations merely set forth for a clear understanding of the principles of the invention. Many variations and modifications may be made to the above-described embodiment(s) of the invention without substantially departing from the spirit and principles of the invention. Accordingly, all such modifications are intended to be included herein within the scope of this disclosure and the present invention, and protected by the following claims.

What is claimed is:

1. A regulator comprising:

a housing comprising a first bore and a second bore in spaced parallel coaxial alignment with each other;

a piston within the first bore having an operating range of at least 5000 PSI;

a piston within the second bore;

an air intake operative associated with the first bore;

an air outlet operative associated with the second bore and having an output of less than, or equal to, 150 PSI; and, wherein a plurality of disk springs are stacked within the first bore.

2. A regulator comprising:

a housing comprising a first bore and a second bore in spaced parallel coaxial alignment with each other;

a piston within the first bore having an operating range of at least 5000 PSI;

a piston within the second bore;

an air intake operative associated with the first bore;

an air outlet operative associated with the second bore and having an output of less than, or equal to, 150 PSI; and, an adjustment knob extending from the housing and wherein the output of the regulator changes as the knob is turned.

3. A regulator comprising:

a housing comprising an inlet, a first stage, a second stage, and an outlet;

the first stage comprising a gas cartridge and a piston having a shaft wherein a plurality of disk shaped rings are received on the shaft;

the second stage comprising a pressure adjustment knob and a piston; and, wherein a gas pressure at the outlet of the housing is less than, or equal to, 150 PSI upon the inlet receiving a gas pressure of about 5000 PSI.

4. The regulator of claim 3, wherein the housing is formed from a single billet.

5. The regulator of claim 3, wherein the housing is extruded metal or metal alloy.

6. The regulator of claim 3, wherein the housing is machined from a single block of metal or metal alloy.

7. A method comprising the steps of:

receiving within a first stage a gas having an input pressure of about 5000 PSI;

reducing the input pressure to an intermediate pressure;

supplying a second stage with the gas at the intermediate pressure;

adjusting a second stage to provide the gas at a pressure within the range of 0 PSI to 150 PSI; and, compressing a plurality of stacked disk shaped rings within the first stage.

8. The method of claim 7, further comprising the step of connecting a hose to receive the gas from the second stage.

9. The method of claim 7, further comprising the step of operatively connecting, via an air hose, a pneumatically operated tool to receive the gas from the second stage.

10. The method of claim 7, further comprising the step of operatively connecting, via an air hose, a paintball gun to receive the gas from the second stage.

* * * * *